United States Patent [19]

Samways et al.

[11] 3,974,118

[45] Aug. 10, 1976

[54] COPOLYMER COATING COMPOSITIONS

[75] Inventors: Bruce Samways, Weston-Super-Mare; Edward George Sanderson; Arthur John Norman Tamlyn, both of Bridgwater, all of England

[73] Assignee: British Cellophane Limited, England

[22] Filed: July 24, 1974

[21] Appl. No.: 491,953

[52] U.S. Cl. ............... 260/29.6 WQ; 260/29.6 TA; 260/29.6 E; 260/29.6 MH
[51] Int. Cl.² ........................................ C08L 27/08
[58] Field of Search ............ 260/29.6 H, 29.6 E, 260/29.6 WQ, 29.6 MH, 29.6 ME, 29.7 E, 29.7 GP, 29.6 R, 29.6 TA

[56] References Cited
UNITED STATES PATENTS

| | | | |
|---|---|---|---|
| 2,467,352 | 4/1949 | Williams | 260/29.6 WQ |
| 2,606,164 | 8/1952 | Henson | 260/29.6 WQ |
| 2,990,391 | 6/1961 | Grantham | 260/29.6 ME |
| 3,219,607 | 11/1965 | Perronin | 260/29.6 WQ |
| 3,668,163 | 6/1972 | Rapp | 260/29.6 WQ |
| 3,716,511 | 2/1973 | Haskell | 260/29.6 ME |
| 3,734,867 | 5/1973 | Will | 260/29.6 WQ |
| 3,826,771 | 7/1974 | Anderson | 260/29.6 H |
| 3,832,321 | 8/1974 | Corey | 260/29.6 MH |
| 3,843,579 | 10/1974 | Eanzel | 260/29.6 MH |

*Primary Examiner*—Paul R. Michl
*Attorney, Agent, or Firm*—Watson, Cole, Grindle & Watson

[57] ABSTRACT

A method for the manufacture of a copolymer coating composition comprises copolymerizing two or more copolymerizable monomers in dispersion in an aqueous medium in the presence of a surfactant to provide a dispersion of the copolymer containing between 30% and 70% by weight of solids then adding the copolymer dispersion with agitation to a sufficient amount of a volatile organic solvent for the copolymer to provide a water-in-solvent emulsion containing between 10% and 25% by weight of copolymer.

Substrates coated with the copolymer coating compositions are also disclosed.

7 Claims, No Drawings

COPOLYMER COATING COMPOSITIONS

This invention relates to copolymer coating compositions and, in particular to coating compositions of vinylidene chloride copolymers.

It is well-known to coat substrates such as films, foils and paper with copolymer coating compositions for various purposes, for example, to provide heat-sealability and/or water-vapour impermeability. Such copolymer coating compositions are usually applied to the substrate in solution in a volatile organic solvent and the coatings are dried by the application of heat.

The copolymer coating compositions are prepared by copolymerising two or more monomers dispersed in an aqueous medium followed by separating the solid products, washing, drying and dissolving in a suitable volatile organic solvent. This procedure is time consuming and costly.

It is also know to coat certain substrates with a copolymer coating composition dispersed in an aqueous medium where the coating is dried to produce a continuous surface coating of the copolymer. However, with certain hydrophilic films such as cellulose film there is a tendency for uneven dimensional changes to occur due to uneven wetting out which leads to poor pull-out properties and difficulties when the films are wound into a roll or processed on film converting machinery.

The present invention is concerned with an improved copolymer coating composition.

According to the present invention a method for the manufacture of a copolymer coating composition comprises copolymerising two or more copolymerisable monomers in dispersion in an aqueous medium in the presence of a surfactant to provide a dispersion of the copolymer containing between 30% and 70% by weight of solids then adding the copolymer dispersion with agitation to a sufficient amount of a volatile organic solvent for the copolymer to provide a water-in-solvent emulsion containing between 10% and 25% by weight of copolymer.

Preferably the ratio of monomers to water in the copolymerisation reaction is selected to give a copolymer dispersion containing between 40% and 65% by weight of solids and the copolymer dispersion is added to a selected amount of organic solvent to provide an emulsion having a copolymer content in the range between 14% and 18% by weight.

The surfactant may be any of the known surfactants employed in the copolymerisation of monomer in aqueous medium, such as sodium naphthalene formaldehyde sulphonate, or a mixture of such surfactants.

If required, additives such as slip agents or antiblocking agents may be incorporated in the coating composition by addition at any stage of the manufacture.

The invention is particularly applicable to the manufacture of vinylidene chloride copolymer coating compositions in which between 75% and 96% by weight of vinylidene chloride is copolymerised with between 4% and 25% by weight of one or more copolymerisable ethylenically unsaturated monomers. Examples of such monomers include acrylonitrile, methacrylonitrile, methyl acrylate, ethyl acrylate, methyl methacrylate, maleic acid, acrylic acid and itaconic acid.

The vinylidene chloride content of the copolymer confers a high degree of water-vapour impermeability to the applied coating. In general, the higher the vinylident chloride content the higher the watervapour impermeability.

The volatile organic solvent may be any of the solvents normally employed in conventional solvent coating methods for the coppolymer. For example, when the copolymer is a vinylidene chloride copolymer, the solvent may conveniently be a mixture of methyl ethyl ketone or tetrahydrofuran with an organic diluent such as toluene. A particularly suitable solvent mixture is tetrahydrofuran/toluene in the proportion of 70:30 by weight.

The copolymer coating composition in accordance with the invention is a "water-in-oil" type of emulsion with the copolymer held in the continuous organic solvent phase. When the emulsion is applied to a hydrophilic substrate such as cellulose film by conventional coating techniques it is found, suprisingly, that the dispersed water in the coating composition is substantially prevented from contacting the hydrophilic substrate so that there is practically no imbibition of water by the substrate, and consequently, dimensional changes consequent upon such imbibition is at a minimum.

The minimal imbibition of water from the coating composition may, if required, be reduced still further by reducing the water content of the dispersion of the copolymer without breaking the dispersion, for example, by a vacuum distillation, before adding the solvent and/or reducing the water content of te water in solvent emulsion by, for example, centrifuging.

In practice the water content of the dispersion should not be reduced below about 30% by weight since the dispersion thereafter becomes viscous and difficult to handle. On reducing the water content of the water-in-solvent emulsion it is necessary to ensure that there is sufficient solvent in the emulsion to provide that the final coating composition contains the copolymer at the required concentration.

The invention also includes a copolymer coating composition when manufactured by the method in accordance with the invention and a substrate when coated with the copolymer coating composition. Substrates which may conveniently be coated with the copolymer coating composition in accordance with the invention are films such as cellulose film or plastics films, foils or paper.

The invention is also applicable to coating compositions in which the copolymerisable monomers are vinyl chloride and vinyl acetate when a convenient volatile organic solvent is a mixture of methyl ethyl ketone and toluene in the proportion of 60:40 by weight.

The invention will now be more specifically described by way of the following example:

EXAMPLE

A mixture of monomers consisting of:

| | |
|---|---|
| Vinylidene chloride | 91½% by weight |
| Acrylonitrile | 6% |
| Methyl methacrylate | 2% |
| Itaconic acid | ½% | was copolymerised in sufficient quantity of water in a pressure vessel to yield a vinylidene chloride copolymer dispersion containing 60% solids by weight.

The reaction was carried out in the presence of a Redox catalyst and a surfactant system consisting of:

½% by weight of the monomers of sodium naphthalene formaldehyde substrate (marketed as "OROTAN SN" by Rohm & Haas Company) and ¼% by weight of the monomers of a sodium alkylated naphthalene sulphonate (marketed as ATEXAL W.A. by the Imperial Chemical Industries Limited).

The vinylidene chloride copolymer dispersion was then added slowly with vigorous stirring into a mixture of tetrahydrofuran and toluene in the ratio of 70:30 by weight in such an amount that a "water in-oil" type of emulsion was formed conting 17% by weight of copolymer. The vinylidene chloride copolymer was contained within the organic solvent continuous phase. Prior to the addition, a slip agent/antiblock system consisting of 1½% oxazoline wax, 2½% stearic acid and 1% talc (percentages by weight based upon the copolymer in the emulsion product) was stirred into the tetrahydrofuran/toluene solvent mixture.

A cellulose film 0.001 inch in thickness and pretreated with a melamine/formaldehyde anchoring resin was coated on both sides with the vinylidene chlorine copolymer coating composition prepared as described above in a conventional coating apparatus. The applied coatings were suitably doctored to provide, after drying, a dry solids coating weight of 3.0 grams per square meter (sum total weight of coatings on both sides of the film). The drying of the coatings after the doctoring operation was carried out by passage of the film through a hot air atmosphere in a drying tower, the coated film was then conditioned in a humid atmosphere and finally wound into a roll. On examination, the coated film was found to have good pull-out properties and could be wound into rolls and processed on film converting machinery such as bag-making machinery with none of the difficulties often associated with film coated with aqueous dispersions of vinylidene chloride copolymers.

We claim:

1. A method for the manufacture of a copolymer coating composition comprising copolymerising at least two copolymerisable monomers in dispersion in an aqueous medium in the presence of a surfactant to provide a dispersion of the copolymer containing between 30% and 70% by weight of the solids, the at least two copolymerisable monomers consisting essentially of between 75% and 96% by weight of vinylidene chloride and between 4% and 25% by weight of at least one copolymerisable ethylenically unsaturated monomer, then adding the copolymer dispersion with agitation to a sufficient amount of a volatile organic solvent for the copolymer to provide a water-in-solvent emulsion containing between 10% and 25% by weight of copolymer in which the copolymer is held in the continuous organic solvent phase.

2. A method as claimed in claim 1 in which the dispersion of the copolymer contains between 40% and 65% by weight of solids and the amount of volatile organic solvent is sufficient to provide an emulsion having a copolymer content in the range between 14% and 18% by weight.

3. A method as claimed in claim 1 in which the ethylenically unsaturated monomers are selected from the group consisting of acrylonitrile, methacrylonitrile, methyl acrylate, ethyl acrylate, methyl methacrylate, maleic acid, acrylic acid and itaconic acid.

4. A method as claimed in claim 1 in which the volatile organic solvent is selected from the group consisting of a mixture of methyl ethyl ketone with an organic diluent and a mixture of tetrahydrofuran with an organic diluent.

5. A method as claimed in claim 4 in which the volatile organic solvent is a mixture of tetrahydrofuran and toluene in the proportion of 70:30 by weight.

6. A method as claimed in claim 1 in which additives may be incorporated in the coating composition by addition at any stage of the manufacture.

7. A method as claimed in claim 1 in which the water content of the copolymer dispersion is reduced without breaking the dispersion and/or the water content in the solvent emulsion is reduced.

* * * * *